United States Patent
Wagner

[15] 3,703,188
[45] Nov. 21, 1972

[54] AUTOMATIC DRAIN VALVE DEVICE

[72] Inventor: Daniel G. Wagner, Pittsburgh, Pa.

[73] Assignee: Westinghouse Air Brake Company, Wilmerding, Pa.

[22] Filed: March 23, 1970

[21] Appl. No.: 21,630

[52] U.S. Cl. .................. 137/204, 137/510, 251/75
[51] Int. Cl. ...................................... F16t 1/14
[58] Field of Search ......... 137/204, 203, 510; 251/75

[56] References Cited

UNITED STATES PATENTS

| | | | |
|---|---|---|---|
| 2,070,421 | 2/1937 | Chisholm | 251/75 |
| 3,516,430 | 6/1970 | Valentine | 137/204 |
| 3,472,264 | 10/1969 | Petry | 137/116.5 |
| 3,482,591 | 12/1969 | Dufresne | 137/116.5 |
| 2,100,485 | 11/1937 | Lindemann | 137/204 |
| 2,812,860 | 11/1957 | Dilworth | 137/204 X |
| 2,730,115 | 1/1956 | Hempel | 137/510 X |
| 2,704,548 | 3/1955 | Ralston | 137/510 X |

*Primary Examiner*—Alan Cohan
*Attorney*—Ralph W. McIntire, Jr.

[57] ABSTRACT

This invention relates to a drain valve apparatus that includes a manually operative means and an automatically operative means arranged in series with the manual means adjacent a storage reservoir from which each is operative to cause the expulsion of contaminants. The manual means comprises a three-position spherical valve having a passageway extending through its center and a valve seat therefor. This valve seat is formed by two identical members each constituting one-half of a cube that is provided with a hemispherical cavity and four semicircular ports, one located on each side of the member and opening into the hemispherical cavity at the outer periphery thereof. The semi-circular ports in the two valve seat members, irrespective of how the two members are arranged one with respect to the other so long as the hemispherical cavities form a spherical cavity for receiving the spherical valve, provide a bearing for receiving a valve stem that is formed integral with the spherical valve to which stem a handle is secured, and a communication through which fluid under pressure and contaminants may be released from the reservoir to atmosphere when the spherical valve is manually rotated by the handle to one of its three positions. When the spherical valve is manually rotated to a second position, it closes the communication to atmosphere and establishes a communication between the reservoir and the automatically-operative means. In its third position, the spherical valve closes both of the above-mentioned communications.

2 Claims, 2 Drawing Figures

INVENTOR.
DANIEL G. WAGNER
BY Ralph U. McIntire, Jr.
ATTORNEY

AUTOMATIC DRAIN VALVE DEVICE

BACKGROUND OF THE INVENTION

Drain valve devices heretofore used to effect the expulsion of contaminants from storage reservoirs have been of the automatic type operable in response to the pressure in the storage reservoir reaching a chosen value to release contaminants therefrom with no means for releasing these contaminants while the pressure in the reservoir is different than this chosen value.

Accordingly, it is the general purpose of this invention to provide a novel, simple and economical combined manually and automatically operable drain valve apparatus for selectively or periodically expelling all contaminants from a storage reservoir.

SUMMARY OF THE INVENTION

According to the present invention, a novel, simple and economical manually operated drain valve is disposed in a communication between a storage reservoir and an automatically operative drain valve device for at any time, independently of the operation of the automatic drain valve device, effecting the expulsion of contaminants from the storage reservoir to atmosphere. This manually operated drain valve comprises a spherical valve having a passageway extending therethrough and two identical members each constituting one-half of a cube that is provided with a hemispherical cavity and four semi-circular ports, one located on each side of the member and opening into the hemispherical cavity at the outer periphery thereof. Irrespective of how the two identical members are arranged one with respect to the other so long as the two opposed hemispherical cavities form a spherical cavity for receiving the spherical valve, two adjacent semi-circular ports in the two members provide a bearing for receiving a valve stem integral with the spherical valve and two other adjacent semi-circular ports in these members constitute a communication through which fluid under pressure and contaminants may be released from the reservoir to atmosphere when the spherical valve is manually rotated to one of three positions by a handle secured to the valve stem. Manual rotation of the spherical valve to a second position closes the communication to atmosphere and establishes a communication between the reservoir and the automatic drain valve device to enable the periodical expulsion of contaminants from the reservoir upon sequential automatic operation of this automatic drain valve device, and manual rotation of the spherical valve to a third position prevents expulsion of contaminants from the reservoir and permits removal of certain parts of the automatic drain valve device for repairs or replacements.

Figure 1:
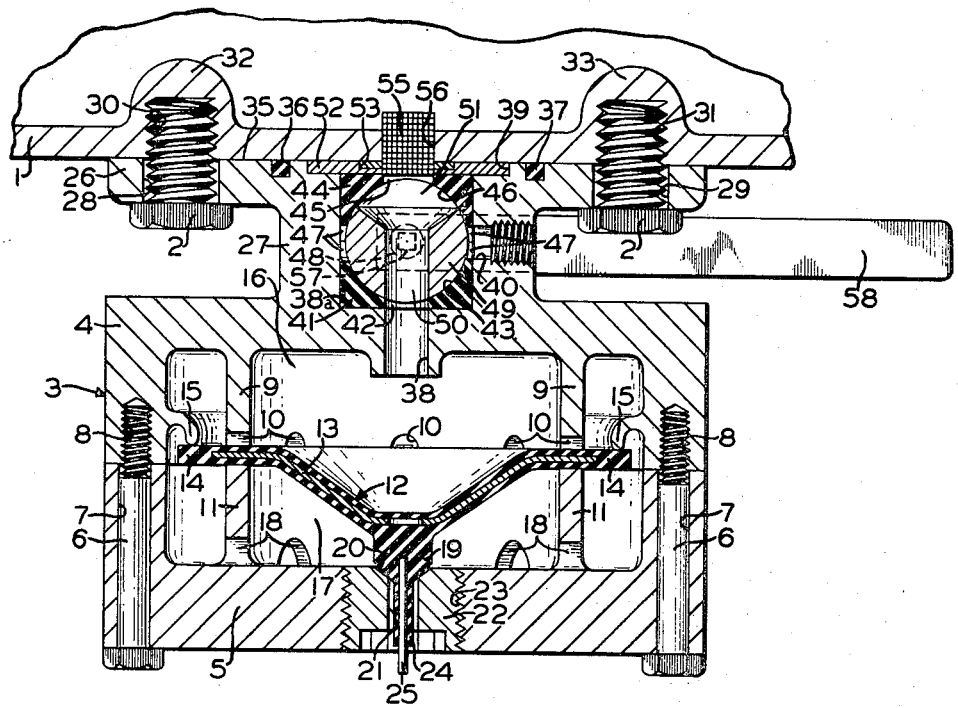
FIG. 1 is a vertical cross-sectional view showing part of a fluid pressure storage reservoir having secured to the bottom thereof a combined manual and an automatically operable drain valve device constructed in accordance with the invention and shown in its closed position.

Referring to FIG. 1 of the drawing, the bottom 1 of a fluid pressure storage reservoir has secured thereto by a pair of cap screws 2 a combined manual and an automatically operative drain valve device 3 which is constructed in accordance with the present invention.

The drain valve device 3 comprises a pair of casing sections 4 and 5 secured together by a plurality of bolts 6 which extend through corresponding smooth bores 7 in the casing section 5 and have screw-threaded engagement with coaxial bottomed bores 8 provided in the casing section 4, it being noted that only two of these bolts 6 appear in the drawing.

Formed integral with the casing section 4 is an annular downwardly-extending lug 9 the end of which is provided with a plurality of spaced-apart semi-circular recesses 10. Likewise, the casing section 5 has formed integral therewith an annular upwardly-extending lug 11 the upper end of which is spaced from the lower end of the lug 9 a distance equal to the thickness of a diaphragm valve element 12 which will now be described in detail.

The valve element 12 comprises an annular Belleville spring 13 having a resilient material such as, for example, rubber bonded to its opposite sides it being noted from the drawing that this resilient material extends beyond the outer periphery of the Belleville spring 13 to form a flat cylindrical valve element 14 that normally seats against an annular valve seat 15 that is formed integral with the casing section 4.

As shown in the drawing, the diaphragm valve element 12 cooperates with the casing sections 4 and 5 to form on its respective opposite sides a pressure chamber 16 and a sump chamber 17. It will be noted that the semi-circular recesses 10 in the annular lug 9 and a plurality of spaced-apart ports 18 provided in the annular lug 11 provide for the flow of fluid under pressure and the contaminants entrained therein from the chamber 16 to the chamber 17 when the flat cylindrical valve element 14 is moved downward and out of seating contact with the annular valve seat 15 upon the pressure in the chamber 16 exceeding the pressure in the chamber 17.

Formed integral with the resilient material bonded to the lower side of the Belleville spring 13 is a poppet-type exhaust valve 19 which, while the diaphragm valve element 12 occupies the position shown in FIG. 1, is seated against a poppet-type exhaust valve seat 20 formed at the upper end of a bore 21 provided in a removable screw-threaded plug 22 that has screw-threaded engagement with a screw-threaded bore 23 provided in the casing section 5.

Formed integral with and of the same resilient material as the exhaust valve 19 is a cylindrical valve stem 24 the diameter of which is less than that of the bore 21. This valve stem 24 is moulded to and around a metallic rod 25 disposed therein which rod extends below the end of the stem 24 and, while the exhaust valve 19 is seated on its seat 20, as shown in FIG. 1, to the exterior of the drain valve device 1. By the application of a force acting in an upward direction to the lower end of the rod 25 while the exhaust valve 19 is seated on its seat 20, as shown in FIG. 1, this valve 19 can be manually unseated from its seat 20 and the Belleville spring 13 simultaneously turned inside out or moved from the position shown in FIG. 1 to the position shown in FIG. 2 to cause the expulsion of contaminants contained in the lower part of the sump chamber 17 to atmosphere via the bore 21 by the fluid under pressure trapped in the upper part of this chamber in a manner hereinafter explained.

As shown in FIG. 1, a flange 26 is integrally connected to the casing section 4 by a cylindrical neck portion 27. This flange 26 is provided with a pair of spaced-apart smooth bores 28 and 29 through which the hereinbefore-mentioned cap screws 2 extend and have screw-threaded engagement with coaxial screw-threaded bottomed bores 30 and 31 provided in a pair of spaced-apart bosses 32 and 33 integral with the bottom 1 of the storage reservoir.

The flange 26 has a bolting face 35 that abuts the bottom 1 of the storage reservoir and disposed in an annular groove 36 provided in this bolting face 35 is a resilient sealing element 37 that forms a seal with the bottom 1.

As shown in FIG. 1, the casing section 4 is provided with a passageway 38 that opens at one end into the chamber 16 and at the opposite end into a coaxial counterbore 38a that is square in cross section and has a depth equal to the length of one side of the square. The upper end of the counterbore 38a opens into a coaxial cylindrical counterbore 39 the diameter of which is substantially greater than the length of the square counterbore 38a.

Opening into the square counterbore 38a midway its depth is one end of a passageway 40 that extends through the cylindrical neck portion 27 and opens at its other end at the peripheral surface of the neck portion 27. This other end of this passageway 40 is provided with internal screw threads for a reason hereinafter made apparent.

Disposed in the bottom of the square counterbore 38a is a member 41 that constitutes one-half of a cube and has therein a short passageway 42 that is coaxial with the above-mentioned passageway 38 in the casing 4. The lower end of this passageway 42 registers with the upper end of the passageway 38 and the upper end opens into a hemispherical cavity 43 provided in the top face of the member 41. Also disposed in the square counterbore 38a and in abutting relationship with the member 41 is a second member 44 that constitutes the other half of the cube and has therein a short passageway 45 that is coaxial with the passageways 38 and 42. The upper end of this passageway 45 opens at the top surface of the second member 44 and the lower end opens into a hemispherical cavity 46 provided in the bottom face of the member 44.

Each of the members 41 and 44 has four semi-circular ports 47, one located on each side of the respective member and opening into the corresponding hemispherical cavity at the outer periphery thereof. These ports 47 in the two members 41 and 44, irrespective of how these members are placed in the square counterbore 38a so long as the hemispherical cavities 43 and 46 form a spherical cavity, provide, first, a communication between this spherical cavity and the passageway 40, and, second, a bearing for a cylindrical valve stem 48 of a ball-type manually operated drain valve element 49 disposed in this spherical cavity.

While the ball-type drain valve element 49 occupies the position shown in FIG. 1, one end of a passageway 50 therein registers with the upper end of the short passageway 42 and the other end opens into a cavity 51 that constitutes a spherical sector of the ball-type valve element 49.

Disposed in the hereinbefore-mentioned counterbore 39 is an annular member 52 that is provided with a counter bore 53 for receiving a flange 54 that is integral with a screen or strainer device 55 adjacent the lower end thereof, it being noted from FIG. 1 that this strainer device 55 extends through a bore 56 provided therefor in the bottom 1 of the storage reservoir. This strainer device 55 is constructed of screen wire of comparatively large mesh to permit the passage therethrough of water and particles of small diameter.

The hereinbefore-mentioned cylindrical valve stem 48 extends through a bearing formed by two opposed semi-circular ports 47 and a bore (not shown) in neck portion 27 and is provided with a short extension 57 that is square in cross section. This short extension 57 extends through a corresponding square hole in a handle 58 this handle being retained on the extension 57 by any suitable means (not shown).

By manually rotating the handle 58 from the position shown in FIG. 1 clockwise through an angle of 45°, the ball-type valve element 49 is rotated from the position shown in FIG. 1 to a second or manual drain position in which water, moisture and contaminants of reasonable small size in the bottom of the storage reservoir may flow to atmosphere via the strainer device 55, short passageway 45, cavity 51 in valve element 49, the port provided by two opposed semi-circular ports 47 and passageway 40. If desired, a threaded end of a piece of pipe can be screw-threaded into the internal screw threads in the passageway 40 to convey this water, moisture and contaminants to a location where they will not fall or be deposited on top of the casing section 4 when discharged to atmosphere from the end of this pipe.

By manual rotation of the handle 58 from the position shown in FIG. 1 clockwise through an angle of 90°, the ball-type valve element 49 is rotated from the position shown in FIG. 1 to a third position in which the interior of the storage reservoir is cut off from both the automatically operative drain valve device 3 and the passageway 40 and pipe connected thereto to permit removal of casing 5 and diaphragm valve element 12 subsequent to the withdrawal of bolts 6 from bottomed bores 8.

For the purpose of understanding the operation of the invention, it will suffice to state that a compressor (not shown) together with an unloader (not shown) and a governor (not shown) function in the usual well-known manner to maintain pressurized fluid in the storage reservoir within an operating range between a predetermined minimum and maximum pressure. When the compressor is unloaded, it operates without compressing further fluid under pressure into the storage reservoir.

Referring to FIG. 1, it will be seen that fluid under pressure will flow from the storage reservoir to the chamber 16 in the drain valve device 3 via the strainer device 55, short passageway 45, cavity 51 and passageway 50 in the ball-type valve element 49, short passageway 42 and passageway 38. It will be noted that water, moisture and any other contaminants entrained in the fluid under pressure in the storage reservoir that are small enough to pass through the strainer device 55 will flow to the chamber 16 along with the fluid under pressure, it being remembered that this strainer device 55 is constructed of screen wire of comparatively large mesh.

Fluid under pressure and the contaminants entrained therein that are supplied to the chamber 16 will flow through the plurality of semi-circular recesses 10 in the annular lug 9 and act in a downward direction on top of the flat cylindrical valve element 14 extending beyond the outer periphery of the Belleville spring 13 and constructed of a resilient material to unseat this valve element 14 from the annular valve seat 15. When the valve element 14 is thus unseated from valve seat 15, fluid under pressure and the contaminants entrained therein flows past this unseated valve element 14 and to the chamber 17 via the plurality of ports 18 in the annular lug 11. Thus, the pressure in the chambers 16 and 17 is increased simultaneously as the compressor increases the pressure in the storage reservoir until the governor operates to unload the compressor.

It will be understood that the contaminants entrained in the fluid under pressure supplied to the chamber 17 will settle to the bottom of this chamber and be subjected to the fluid under pressure present therein which fluid under pressure is confined to the remaining volume of this chamber that is above these contaminants and below the valve element 12 subsequent to the seating of the valve element 14 on the seat 15 which occurs upon unloading of the compressor.

Subsequent to the unloading of the compressor, the usage of fluid under pressure from the storage reservoir will effect a reduction of the pressure therein. Since the chamber 16 in the drain valve device 3 is directly connected to the storage reservoir via passageways 38, 42 and 50, cavity 51, short passageway 45 and strainer device 55, a corresponding reduction of pressure will occur in the chamber 16, it being understood that the cylindrical valve element 14 is seated on the valve seat 15 and therefore, prevents a corresponding reduction of pressure in the chamber 17.

It is a known characteristic of Belleville springs that if the ratio of height to thickness is greater than 1.41, the load reaches a peak and then decreases with further deflection. If the ratio of height to thickness is greater than 2.83, the load will become negative at some point beyond the horizontal position and will require loading in the opposite direction to bring it back to its free position. In other words, it will turn inside out. For a "constant load" spring the ratio of height to thickness should be between 1.3 and 1.6.

In order to insure proper operation of the drain valve 3, the ratio of height to thickness of the Belleville spring 13 should be between 1.6 and 2.83 so that this spring will turn inside out upon the pressure in the chamber 16 being reduced to a value that is a chosen amount less, for example, 10 pounds per square inch, than the pressure trapped in the chamber 17 by the valve 14, and then return to the position shown in FIG. 1 upon the pressure in the chamber 17 being reduced to a chosen value, which, for example, may be 132 pounds per square inch.

Assuming that the governor operates to effect unloading of the compressor upon the pressure in the storage reservoir 1 reaching a value of, for example, 140 pounds per square inch, it will be understood that the pressure in the chambers 16 and 17 in the drain valve device 3 is the same as that in the storage reservoir prior to use of compressed fluid from this reservoir. Accordingly, when the use of fluid under pressure from the storage reservoir has reduced the pressure therein and in the chamber 16 in drain valve device 3 to a value of 130 pounds per square inch, it being remembered that the trapped pressure in the chamber 17 is 140 pounds per square inch, a pressure differential of 10 pounds per square inch is established on the opposite sides of the diaphragm valve element 12 and likewise on the opposite sides of the Belleville spring 13 which differential is acting in an upward direction and is sufficient to cause this Belleville spring to turn inside out.

Figure 2:
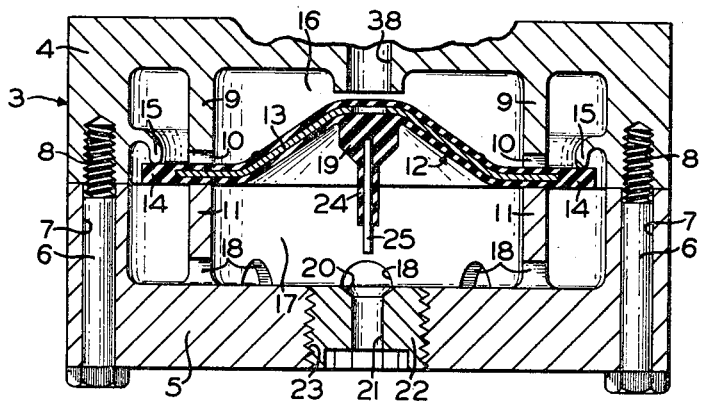
FIG. 2 is a cross-sectional view of the automatically operable drain valve device of FIG. 1 shown in its open or unseated position.

When the Belleville spring 13 is thus turned inside out, or moved from the position in which it is shown in FIG. 1 to the position in which it is shown in FIG. 2, the diaphragm valve element 12 and exhaust valve 19 are likewise moved to the position shown in FIG. 2 in which the exhaust valve 19 is unseated from its seat 20 and the stem 24 and rod 25 withdrawn from the bore 21.

When the valve 19 is thus unseated from its seat 20, the trapped fluid under pressure present in the chamber 17 above the contaminants in this chamber and acting on the lower side of the valve element 12 is rendered effective to force substantially all of the contaminants in the chamber 17 to flow to atmosphere via the bore 21 before this fluid under pressure likewise flows to atmosphere via this bore.

When the fluid under pressure present in the chamber 17 has reduced to a value of, for example, 132 pounds per square inch, the remaining differential fluid pressure force acting on the opposite sides of the Belleville spring 13 is insufficient to maintain this spring turned inside out and in the position in which it is shown in FIG. 2.

Consequently, it turns outside in or, in other words, returns or snaps back to the position shown in FIG. 1.

When the Belleville spring 13 returns to the position shown in FIG. 1, it is effective to simultaneously deflect the diaphragm valve 12 downward to the position shown in FIG. 1. In this position of the diaphragm valve 12 and Belleville spring 13, this spring is effective to bias the exhaust valve 19 against its seat 20 which prevents further flow of fluid under pressure from the sump chamber 17 to atmosphere via the bore 21 in which is now disposed the valve stem 24.

When further use of fluid under pressure from the storage reservoir reduces the pressure therein to the value at which the governor operates to reload the compressor, this compressor will operate to supply fluid under pressure to the storage reservoir and to the chambers 16 and 17 in the drain valve device 3 until the pressure therein is increased to the value required to cause unloading of the compressor.

Subsequent use of fluid under pressure from the storage reservoir will reduce the pressure therein and in the chamber 16 to cause the drain valve device 3 to again operate in the manner hereinbefore described in detail to release contaminants from the chamber 17 in the drain valve device 3.

From the foregoing, it is apparent that each time the pressure in the storage reservoir is reduced a certain amount as the result of usage of fluid under pressure therefrom subsequent to the unloading of the compressor that supplies fluid under pressure to this storage reservoir, the drain valve device 3 operates to expel contaminants to atmosphere. Thus, the storage reservoir is kept substantially free of contaminants which if allowed to collect therein would reduce its volume and therefore, the quantity of fluid under pressure stored therein.

Having now described the invention, what I claim as new and desire to secure by Letters Patent, is:

1. Apparatus operable in response to a certain degree of reduction of pressure in a fluid pressure storage reservoir to expel contaminants therefrom, said apparatus comprising, in combination:
   a. a two-position snap-acting Belleville spring normally subject on its respective opposite sides to a fluid pressure force in accordance with the pressure of fluid present in the storage reservoir and operable to snap respectively from one to another position and from said another position to said one position accordingly as the fluid pressure force effective on one side is respectively decreased and subsequently increased with respect to the fluid pressure force on the other side,
   b. an abutment having a pair of separate fluid pressure chambers at the respective opposite sides thereof and so cooperating with said Belleville spring that the pressure in one of said chambers is effective on said one side of said spring and the pressure in the other of said chambers is effective on said other side of said spring,
   c. means effective to supply fluid under pressure from the fluid pressure storage reservoir to each of said chambers, the contaminants entrained in said fluid under pressure being supplied therewith to at least said other chamber, and said one chamber being constantly in communication with the fluid pressure storage reservoir,
   d. an exhaust valve operated by said abutment to establish a fluid pressure communication between said other chamber and atmosphere through which contaminants and fluid under pressure are successively released from said other chamber to atmosphere in response to a reduction of the pressure in said one chamber and correspondingly the fluid pressure force on said one side of said spring as the result of usage of fluid under pressure from the fluid pressure storage reservoir sufficient to cause the establishment of that differential fluid pressure force on said spring required to effect the snap action thereof necessary to enable said abutment to operate said exhaust valve to establish said fluid pressure communication, said exhaust valve being operable by said abutment to close said fluid pressure communication in response to a reduction of the pressure in said other chamber and correspondingly the fluid pressure force on said other side of said spring sufficient to cause the establishment of that differential fluid pressure force on said spring required to effect the snap action thereof necessary to enable said abutment to operate said exhaust valve to close said fluid pressure communication,
   e. a removable exhaust valve seat for said exhaust valve, and wherein the improvement comprises
   f. a three-position manually-operable drain valve interposed between the interior of the storage reservoir and said one chamber and comprising:
      i. a spherical valve element having an operating stem and rotatable by said stem to a first, a second and a third position, said valve element having a passageway extending through the center of said element, one end of said passageway opening at the surface of said spherical valve element and the other end opening into a cavity that constitutes a spherical sector of said spherical valve element,
      ii. a valve seat for said spherical valve element, said valve seat comprising:
         1. a pair of valve seat members each of which constitutes one-half of a cube and is provided with a hemispherical cavity and four semi-circular ports, one located on each side of said valve seat member and opening into the corresponding hemispherical cavity at the outer periphery thereof, said semi-circular ports in said pair of valve seat members, irrespective of how said members are arranged one with respect to the other so long as said hemispherical cavities form a spherical cavity for receiving said spherical valve element, providing a bearing for receiving said valve stem and a communication through which fluid under pressure and contaminants may be released from the interior of the storage reservoir to atmosphere in said second position of said spherical valve element, and
      iii. a handle secured to said operating stem for effecting manual rotation of said spherical element to its said positions, in the first of which it establishes a first communication between the storage reservoir and said one chamber, in the second of which it closes said first communication and establishes a second communication between the interior of the storage reservoir and atmosphere, and in the third of which it closes said first and second communications.

2. Apparatus to expel contaminants from a fluid pressure storage reservoir, as recited in claim 1, further characterized in that said apparatus further comprises a sectionalized casing having a pair of opposed cup-shaped casing sections each of which has an annular perforated lug integral with and extending from the bottom thereof between which lugs said abutment is anchored, said cup-shaped casing sections cooperating with said abutment to form on the respective opposite sides thereof said one and said other chamber into each of which one of said lugs extends, one of said casing sections being provided with a flange having a bolting face to enable said apparatus to be removably secured to a corresponding bolting face on the storage reservoir and with a square counterbore extending inward from said bolting face of said flange to a depth sufficient to provide a cubical cavity for receiving said pair of valve seat members.

* * * * *